United States Patent [19]
Yu et al.

[11] Patent Number: 6,167,086
[45] Date of Patent: Dec. 26, 2000

[54] OVERHEAD DATA PROCESSOR IN A MEMORY EFFICIENT IMAGE PROCESSING SYSTEM

[75] Inventors: Haoping Yu; Barth Alan Canfield, both of Indianapolis; Billy Wesley Beyers, Jr., Greenfield, all of Ind.; Wai-man Lam, Mohegan Lake, N.Y.

[73] Assignee: Thomson Licensing S.A., Boulogne, France

[21] Appl. No.: 08/908,116

[22] Filed: Aug. 12, 1997

Related U.S. Application Data

[60] Provisional application No. 60/032,997, Dec. 10, 1996.

[51] Int. Cl.[7] .................................................. H04N 7/18
[52] U.S. Cl. ................... 375/240.03; 348/403; 348/404; 348/405
[58] Field of Search .................................. 348/384, 400, 348/401, 402, 403, 404, 405, 407, 415, 416, 420, 421, 422, 443, 845.1, 845.2; 375/240.03

[56] References Cited

U.S. PATENT DOCUMENTS

| | | | |
|---|---|---|---|
| 4,903,124 | 2/1990 | Hoshi et al. | 358/133 |
| 5,258,835 | 11/1993 | Kato | 358/135 |
| 5,307,163 | 4/1994 | Hatano et al. | 348/415 |
| 5,307,177 | 4/1994 | Shibata et al. | 358/430 |
| 5,396,567 | 3/1995 | Jass | 382/56 |
| 5,539,865 | 7/1996 | Gentile | 395/115 |
| 5,617,219 | 4/1997 | Oikawa | 386/111 |
| 5,703,652 | 12/1997 | Kondo et al. | 348/421 |
| 5,731,837 | 3/1998 | Hurst, Jr. | 348/405 |
| 5,734,755 | 3/1998 | Ramchandran et al. | 348/403 |
| 5,751,359 | 5/1998 | Suzuki et al. | 348/401 |
| 5,822,462 | 10/1998 | Miyake | 348/405 |
| 5,825,424 | 10/1998 | Canfield et al. | 348/416 |
| 5,933,194 | 8/1999 | Kim et al. | 348/403 |

FOREIGN PATENT DOCUMENTS

| | | | |
|---|---|---|---|
| 0601878A1 | 6/1994 | European Pat. Off. | H04N 7/13 |
| 0627858A2 | 12/1994 | European Pat. Off. | H04N 7/13 |
| 0687111A2 | 12/1995 | European Pat. Off. | H04N 7/24 |
| 6-216784 | 8/1994 | Japan | H03M 7/50 |
| 7-086955 | 3/1995 | Japan | H03M 7/30 |
| 7-162854 | 6/1995 | Japan | H04N 7/24 |
| WO97/47139 | 12/1997 | WIPO | H04N 7/26 |

OTHER PUBLICATIONS

Patent Abstracts of Japan, vol. 018, No. 577, (E–1625), Nov. 4, 1994.
Patent Abstracts of Japan, vol. 095, No. 006, Jul. 31, 1995.
Patent Abstracts of Japan, vol.095, No. 009, Oct. 31, 1995.
Monet P. and Dubois E.: "Block Adaptive Quantization of Images", IEEE Transactions on Communications, vol. 41, No. 2, Feb. 1993, pp. 303–306.
Kondo T. et al., "Adaptive Dynamic Range Coding Scheme For Future HDTV Digital VTR", Signal Processing of HDTV, 3, Turin, Sep. 4–6, 1991, pp. 43–50.
PCT Search Report (Note:Not every reference listed above on PCT Search Report.).
"Video compression makes big gains", by Peng H. Ang, Peter A. Ruetz, and David Auld—LSI Logic Corp., IEEE Spectrum— Oct., 1991, pp. 16–19.
"Fundamentals of Digital Image Processing", by Anil K. Jain, pp. 476–498, Prentice–Hall International, Inc.

*Primary Examiner*—Andy Rao
*Attorney, Agent, or Firm*—Joseph S. Tripoli; Ronald H. Kurdyla; Alexander J. Burke

[57] ABSTRACT

In an MPEG compatible image signal processor an MPEG data stream is decoded, decompressed and recompressed before blocks of image pixel values are stored in memory. The recompression system evaluates block data to determine the range and minimum pixel values for a given image block of pixels values. These values are encoded, and the encoded representations are stored in a parameter field with the quantized data block to facilitate data reconstruction. Encoding occurs by fitting the actual range and minimum values to a predetermined set of values. Each selected predetermined value is then encoded as a three-bit index in the parameter field. Storing the encoded values with the quantized data facilitates reconstruction with minimal error. Also, encoding the values preserves memory for the quantized data.

13 Claims, 4 Drawing Sheets

RCA88503

OVERHEAD DATA PROCESSOR IN A MEMORY EFFICIENT IMAGE PROCESSING SYSTEM

This application claims priority of a provisional application, Ser. No. 60/032,997, filed Dec. 10, 1996 by Yu et al.

FIELD OF THE INVENTION

This invention concerns a digital video processor. Specifically, the invention concerns a system for efficiently transferring overhead data associated with compressed video data.

BACKGROUND OF THE INVENTION

The efficient use of memory is important in the design and operation of image processors. For example, consumer products such as television systems may use image processors including MPEG-2 signal processing. The MPEG (Motion Picture Experts Group) signal compression standard (ISO/IEC 13181-2, May 10, 1994) is a widely accepted image processing standard which is particularly attractive for use with satellite, cable and terrestrial broadcast systems employing high definition television (HDTV) processing among other forms of image processing. Products using high definition displays require 96 Mbits or more of memory to temporarily store MPEG decoded frames prior to display. An MPEG processor requires these frames for motion estimation and compensation to reconstruct accurate images for display.

Systems which reconstruct images from MPEG decoded picture elements (pixels or pels) typically employ Differential Pulse Coded Modulation (DPCM). In DPCM processing a processor generates a prediction which anticipates the next pixel value. A summation network subtracts the prediction from the actual pixel value resulting in a difference which anticipates the next pixel value. This difference, known as prediction error, is generally smaller than the original pixel or prediction values, and processing the difference rather than the original pixel value reduces system bandwidth requirements. Ang et al., "Video Compression Makes Big Gains," IEEE Spectrum, October 1991, describes an MPEG encoder and decoder.

Memory efficient image processors use less memory to store image frames by recoding (recompressing) the block data prior to storage. In the spatial domain, reducing the number of bits per pixel used to store the image frames adversely affects the picture quality if the pixels can not be accurately reconstructed to their original bit size. Artifacts may occur, especially in smooth areas of the image. Memory reduction image processors should accurately quantize and dequantize the MPEG decoded signal as efficiently and economically as possible.

The present inventors recognize the desirability of providing an efficient data reduction system employing minimal hardware and software which will minimize artifacts the system introduces into the reconstructed data. A system according to the present invention satisfies these objectives.

SUMMARY OF THE INVENTION

In accordance with the principles of the present invention, an image processor determines the minimum pixel value and the range of pixel values for an image block. The processor selects a best-fit between the range and a set of predetermined ranges. Each predetermined range has an associated set of predetermined minimum values, and the processor selects a best-fit between the pixel block minimum value and the predetermined minimum values associated with the predetermined range selected. The processor encodes the selected predetermined range and the selected predetermined minimum value with a reduced-bit code, and stores the encoded values in memory with the compressed block data.

DETAILED DESCRIPTION OF THE PREFERRED EMBODIMENT

In an exemplary embodiment of the invention, a television receiver includes an MPEG decoder. A data reduction network quantizes a decoded and decompressed MPEG signal representing image blocks prior to storage in frame memory, and reconstructs the image blocks when needed for an image display. A display device displays image information derived from frame memory.

To maintain data integrity through the data reduction network, the network scans a pixel block and determines the range of image pixel values and the minimum pixel value. The network performs a best-fit analysis between the range and a set of predetermined ranges. Except for the smallest and largest predetermined range, each predetermined range has a set of predetermined minimum values. The network performs a best-fit analysis between the pixel block minimum value and the predetermined minimum values associated with the predetermined range selected.

The selected predetermined range and the selected predetermined minimum value are each indexed with a representative three-bit code. For the smallest predetermined range the network retains the actual eight-bit minimum value, and for the largest predetermined range the network selects the value of zero which requires no bits.

The indexed representations for the range and minimum values are stored in frame memory with the quantized pixel block. Storing representative values instead of the actual eight-bit values makes memory available for storing quantized pixel values. Quantized pixel values are efficiently represented with less than eight bits per representation, because the block specific range and minimum pixel values facilitate reconstruction.

Figure 1:
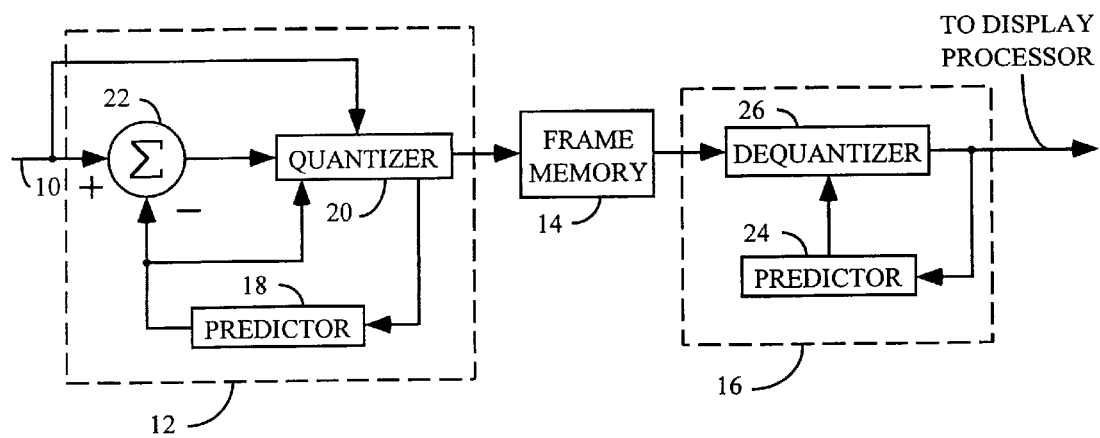
FIG. 1 is a block diagram of a pixel block processor which includes a system according to the present invention.

In FIG. 1, an MPEG decoder provides a block of MPEG decoded pixel data to input 10 of a memory reduction processor including compressor 12. Compressor 12 includes a predictor 18, a quantizer 20, and a combiner 22. The pixel block is in the spatial domain, and comprises an 8×8 block of image pixels, for example. Predictor 18 employs well known principles and may be of the type described in Jain, A., Fundamentals of Digital Image Processing, Prentice-Hall, Inc., p. 484 (1989), for example.

Quantizer 20 provides a data reduced pixel block to memory 14. When a display processor (not shown) accesses the reduced data block in memory 14 to display an image, decompressor 16 reconstructs the original data block. Decompressor 16 includes predictor 24 and dequantizer 26 to retrieve reduced data from memory 14 and to reconstruct the reduced data block. Quantizer 20 and dequantizer 26 are arranged according to the principles of the present invention as will be discussed. Predictor 24 is similar to predictor 18.

Figure 7:
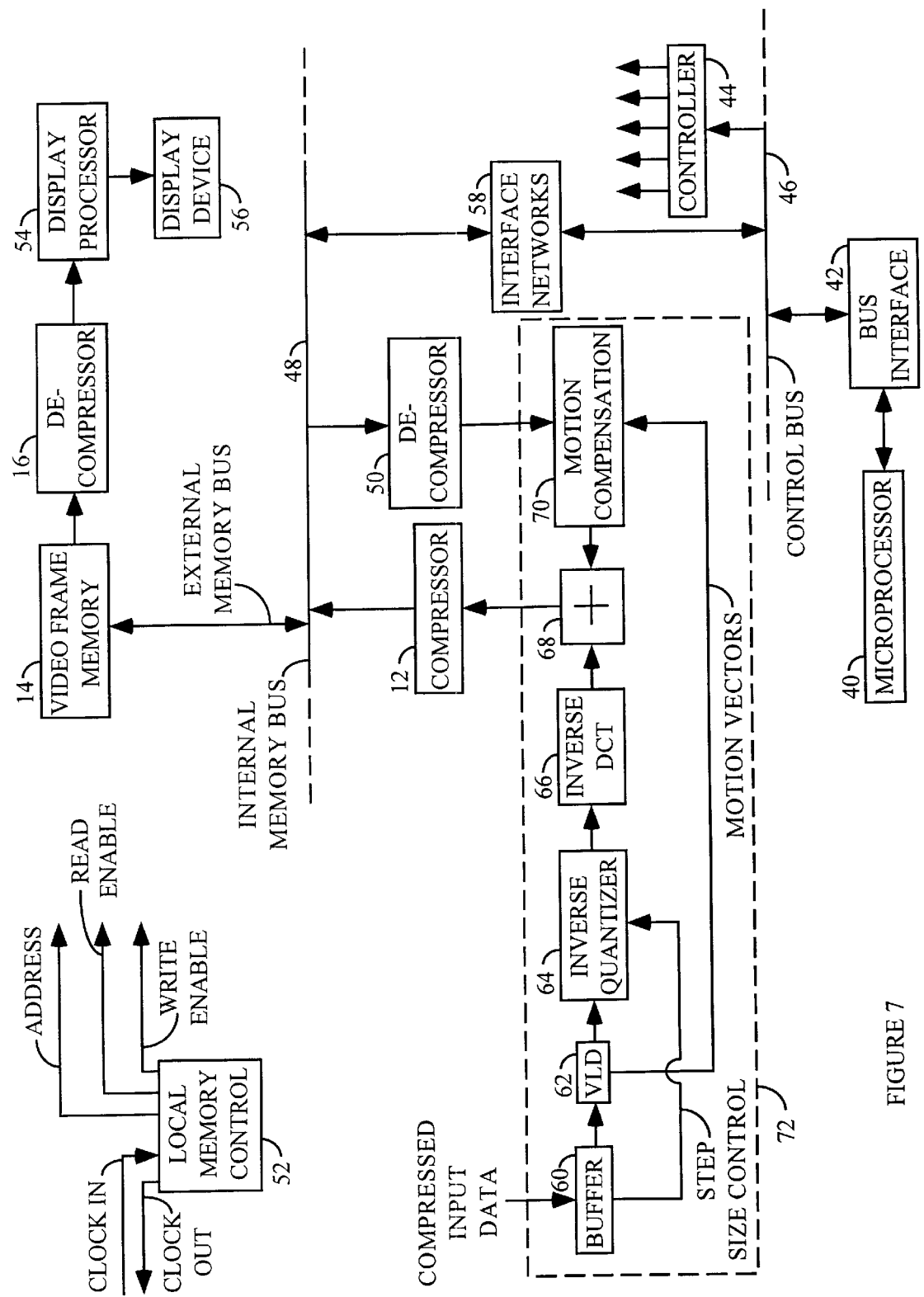
FIG. 7 is a block diagram of an MPEG compatible television system employing the present invention.

Input 10 of compressor 12 receives a pixel block from an MPEG decoder (shown in FIG. 7). Input 10 supplies the pixel block data to a non-inverting input of combiner 22 and to quantizer 20. Predictor 18 supplies pixel prediction data to an inverting input of combiner 22 and to quantizer 20. Combiner 22 combines its signals from inverting and non-inverting inputs and provides the difference to quantizer 20. Quantizer 20 outputs reconstruction level values to predictor 18 and encoded pixel difference values to memory 14 for storage.

Figure 2:
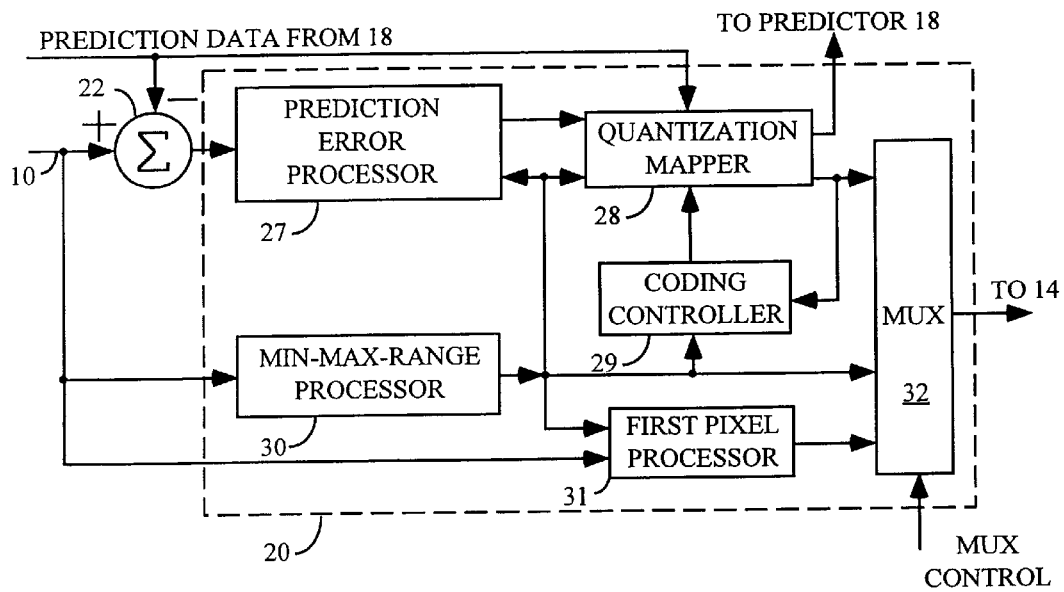
FIG. 2 shows details of the compression portion of the FIG. 1 system.

FIG. 2 illustrates quantizer 20 of FIG. 1 in greater detail. Throughout the specification, the same reference numbers identify common elements in the Figures. Specifically, quantizer 20 includes prediction error processor 27, quantization mapper 28, coding controller 29, min-max-range processor (MMRP) 30, first pixel (reference pixel) processor 31, and multiplexer 32. Input 10 provides block pixel data to MMRP 30, which scans the pixel block and determines the minimum pixel value, the maximum pixel value, and the range for the block. MMRP 30 selects a predetermined range from a set of predetermined ranges as a function of the actual range, and exchanges the selected predetermined range for the actual range for subsequent use within the network. MMRP 30 also identifies a predetermined minimum pixel value using information from the selected predetermined range to represent the pixel block in place of the actual minimum pixel value. MMRP 30 compresses the predetermined minimum pixel and range block parameter values and transfers them to multiplexer 32.

The selected predetermined minimum pixel value and the range are also transferred to first pixel processor 31, and the predetermined range is transferred to prediction error processor 27, as will be discussed. Prediction error processor 27 receives prediction error data from combiner 22 and biases negative values with the selected predetermined range. Quantization mapper 28 receives biased and unbiased prediction error values from prediction error processor 27. These values are quantized and encoded and sent to multiplexer 32. Quantization mapper 28 also sends reconstruction level values to predictor 18 which uses the values to calculate prediction data. Multiplexer 32 sends block parameters - the compressed minimum pixel value, range and reference pixel value—and the quantized data to memory 14 under timing and control which will be discussed later. The block parameters represent overhead data which are stored in memory 14 within a parameter field associated with the quantized pixel block. The parameter field and the quantized data together form a packet which consolidates all of the information needed by decompressor 16 to access appropriate dequantization tables and to reconstruct the pixel block. Coding controller 29 oversees the transfer of block parameters and compressed data, as well as the selection of quantization tables for individual pixel representative values.

First pixel processor 31 receives the pixel block from input 10, and identifies a predetermined reference pixel value. The block minimum pixel value received from MMRP 30 facilitates compression of the reference pixel independently of other block pixels. The compressed reference pixel is represented with sufficient bits for dequantizer 26 to reconstruct its original value in a lossless or near lossless manner. First pixel processor 31 passes the compressed reference pixel value as a block parameter to multiplexer 32 which transfers block parameters, including the reference pixel value, and the quantized data to memory 14. Dequantizer 26 uses the reference pixel as a prediction value for the quantized block pixels during pixel reconstruction. Since the first value (the reference pixel value) used in the prediction network during decompression is independent, a given pixel block can be decompressed without information from other pixel blocks. This value is also accurate, which eliminates a propagating prediction error from the reconstructed data.

The reference pixel is compressed using the pixel block minimum value as a predictor for deriving the compressed value. The selected predetermined minimum value is subtracted from the reference value and the difference is divided by two. The result is stored in memory 14 with one less bit than is necessary for a binary representation of the predetermined range. The predetermined range defines the number of bits used to store the compressed reference pixel value because, when using block pixel values as predictors for other values in the same pixel block, the difference between any two block pixel values, such as the reference and minimum pixel values, will fall within the domain of the range. The compressed reference value uses one bit less than is necessary to represent the range because the difference is a positive number which is divided by two, which reduces the number of bits required for a binary representation by one bit.

Quantizer 20 and dequantizer 26 access quantization and dequantization tables respectively which are optimized to each block. The quantization and dequantization tables include values based on a predetermined range of the pixel block. MMRP 30 receives an input data block and scans it to determine the minimum pixel value and the maximum pixel value. MMRP 30 then subtracts the minimum from the maximum and adds one (max-min+1) to calculate the range for the pixel block.

Quantizer 20 and dequantizer 26 compare the calculated range to a set of predetermined ranges, at least one of which is greater than or equal to the calculated range, select a predetermined range, and access quantization and dequantization tables respectively derived from the predicted range. The predetermined range is selected by a best-fit analysis that determines which predetermined range is the smallest of the set which is larger than or equal to the actual calculated range. The quantization and dequantization tables are customized to include values within the domain of the selected predetermined range, and therefore include values of the entire actual range. Quantizer 28 employs DPCM processing and produces difference values which are prediction errors, and these prediction errors lie in the domain of the actual range. The actual range is often significantly less than 256 (the maximum value of an 8-bit pixel value). Table levels derived from this range provide better resolution than table levels derived from 256, because the selected predetermined range is generally close in value to the actual range and may be represented by less than eight bits. Therefore, system accuracy and efficiency increase by customizing the table levels to the range.

Figure 3:
FIG. 3 depicts a packetized data format suitable for use by a system according to the present invention.

To reconstruct the input block data, dequantizer 26 must know which predetermined range quantizer 28 used to access the quantization table employed when quantizing the pixel block. Representations of the range and other pixel block parameters are stored in memory 14 within a parameter field with the quantized pixel block as a payload. Together the parameter field and payload form a compressed data packet. By storing a block parameter representation in memory 14 along with the quantized pixel block, dequantizer 26 may access the proper dequantization table and reconstruct the pixel block efficiently and accurately. FIG. 3 illustrates one possible configuration of parameter field 33 and compressed data payload 35. In this embodiment, parameter field 33 is arranged as a header of a data packet containing compressed data payload 35.

In this embodiment, memory 14, which stores image frames needed by a display processor, is reduced in size by fifty percent. For an eight-bit pixel, which is assumed for the purposes of this embodiment, a fifty percent reduction provides an average of four bits in memory 14 to store each pixel representation after compression. The overhead information represented by the block parameters in parameter field 33 require space in memory 14. Every bit used to store the parameter field decreases the memory available for storing quantized pixels. The overall effect is to reduce the resolution available for quantized data because memory capacity is held constant at its predetermined reduced size. Increasing the memory size to compensate for the overhead information causes undesirable increases in manufacturing costs because memory is generally only available in fixed block sizes from manufacturers. These are significant costs considering there are 32,640 8×8 pixel blocks in a HDTV image frame, as specified by the Grand Alliance specification. Three eight-bit words add 783,360 bits per frame to the memory requirements of each television receiver using this system. Also, system reliability decreases because the extra memory requires additional hard-wire connections, each one of which is a potential failure point.

A system using the present invention decreases the number of bits required to store two of the block parameters, namely the range and minimum value, from eight bits to three bits for each parameter for most cases. This saves ten bits in memory per pixel block, which translates to 326,400 bits saved for each image frame stored in memory. Once quantizer 20 determines the actual range and minimum pixel value, these values are quantified and indexed, as follows.

The actual range is compared to a set of predetermined ranges to determine a best-fit. The predetermined range becomes the value used to represent the range for the pixel block then being processed. The predetermined range is larger than the actual range to ensure that all pixel values within the pixel block are represented, as will be discussed in association with FIG. 4. The set of predetermined ranges include seven values. Since the set is available to both quantizer 20 and dequantizer 26, the predetermined range may be represented in the parameter field by one index value. The index requires only three bits for a binary representation because there are only seven predetermined ranges to represent.

The system handles the minimum pixel value in a similar manner. For five of the seven predetermined ranges, the system accesses a predetermined set of eight minimum pixel values unique to the selected predetermined range. Quantizer 20 compares the actual minimum pixel value to the predetermined set and selects the largest predetermined minimum value which is less than or equal to the actual minimum value. The predetermined minimum then becomes the value used to represent the minimum pixel for the pixel block being processed. The set is available to both quantizer 20 and dequantizer 26, so the predetermined minimum may be represented in the parameter field by one index value. This index also requires three bits for a binary representation because there are only eight predetermined minimum pixel values to represent.

As stated previously, each index value requires three bits, which results in six bits being stored in each parameter field instead of sixteen bits. The saved bits preserve memory for storing quantized pixels. This increases the resolution of the quantized pixel data, because the bits saved by encoding the block parameters allow finer quantization (resolution) of pixel data.

The following expression defines the set of predetermined ranges and their selection. Rs is the selected predetermined range from the set, and Ri is the range represented by the index value i, where i is the index value for the selected range to be represented by three bits in the parameter field. R is the actual range value of the pixel block.

$$Rs=MIN_i\{Ri|Ri>=R, Ri=16, 32, 64, 96, 128, 192, 256; 0<=i<=6\} \quad (1)$$

MIN{f(x)} indicates that the selected range, Rs, is the smallest value of the set which satisfies the condition Ri>=R. The expression f(x) within the brackets is representative of any expression, such as the one in equation (1), upon which the function MIN operates. For example, if R is 73, equation (1) produces 96 as the resulting value for Rs. Any value of R from 65 to 96 produces the same result.

The seven predetermined ranges of equation (1) are derived from the binary progression of numbers in general, and by the predetermined average number of bits available in a particular system to represent a compressed and decompressed pixel. Since memory is reduced by fifty percent, an eight-bit pixel (the largest for this example) compresses to four bits on average. Therefore, 16 (four bits) and 256 (eight bits) are the smallest and largest values within the set of predetermined ranges. Values such as those shown which occur at $2^n$ increments are natural selection breaks for the set of predetermined ranges because each increment or decrement in n requires one more or one less bit for a binary representation of the range. The exponential expression $2^n$ provides five values, 16, 32, 64, 128, and 256. A three-bit index provides for up to eight ranges and allows other predetermined ranges to be added in the gaps to increase resolution. For this embodiment, the gap-added predetermined ranges are 96 and 192.

The set of eight predetermined minimum pixel values for five of the seven ranges are defined by equation (2) below. The five ranges to which equation (2) applies are 32, 64, 96, 128, and 192. The equation provides a constant linear step beginning with zero.

$$Qmin(Rs,i)=INT\{i((256-Rs)/7)\}; 0<=i<=7. \quad (2)$$

In this equation i is the index value for the selected minimum pixel value to be represented by three bits in the parameter field. INT {f(x)} indicates that only the integer portion of the resulting value is used. The expression f(x) within the brackets is representative of any expression, such as the one in equation (2), upon which the function INT operates.

Equation (3) below selects the predetermined minimum pixel value from the set which is substituted for the actual minimum pixel block value. MAXi{f(x)} indicates that the maximum value of i which satisfies the condition within the brackets is to be used to generate Qmin.

$$Qmin=MAX_i\{Qmin(Rs, i)|Qmin(Rs, i)<=Xmin; 0<=i<=7\} \quad (3)$$

Equation (4) states the necessary and sufficient condition for selecting valid block parameters to enable accurate representation during quantization. The selected predetermined range and minimum value must together satisfy the condition of equation (4). If they do not, another set of values which satisfy the condition must be chosen as will be discussed below. Qmin(Rs) is the result of equation (3) above.

$$Rs+Qmin(Rs)>Xmax \qquad (4)$$

Two ranges, 16 and 256, are special cases and are treated differently. The range of 256 is special because it represents the maximum value which eight bits can represent. If the range is the 256, then the minimum pixel value defaults to zero because all positive eight-bit values occur within zero to 256. No bits are needed or used in the parameter field to represent this value which provides three more bits for storing quantized data.

The predetermined range 16 is also a special case because it is smaller than the linear step between the associated set of minimum values as is defined by equation (2). If a set of eight predetermined minimum values were used for this range, the constant step between each minimum value would be approximately 34. The value 34 is more than twice the range of 16. It is possible to select a predetermined minimum pixel value for the predetermined range of 16, add the predetermined range to the selected minimum, and not even have the actual minimum value. For example, if the predetermined range of 16 is selected, and the actual block minimum pixel value is 90, equation (3) produces a selected minimum pixel value of 68. Whereas the actual pixel values may be from 90 to 102, the system would generate pixel values from 68 to 84 upon reconstruction. It is likely that the error resulting from this example would cause noticeable distortion in the displayed image. This occurs on reconstruction of the quantized pixel block because the prediction network of dequantizer 26 employs the minimum pixel value as a constant offset for all reconstructed pixel block values. Furthermore, quantizer 20 will recognize that the actual values will not be represented and select the next largest range which will represent all actual values. Therefore, when the predetermined range of 16 is selected the actual eight-bit minimum pixel value is stored in the parameter field.

Sixteen (16) is the smallest predetermined range of the set because this embodiment reduces memory by fifty percent. This reduction requires eight-bit words to be represented by four bits on average. With a range of 16, only the values 0 to 15 need be represented and four bits allows lossless quantization. Therefore, a range smaller than 16 has no additional benefit. For a flat image without motion, for example a cloudless sky, small quantization errors produce noticeable artifacts when reconstructed. Flat images, however, are where the range of 16 is most likely to occur precisely because there is little or no variation of color or motion.

This analysis of what minimum predetermined range value to select for a particular system may be used for any memory reduction percentage. For example, a twenty-five percent reduction in memory requires six bits for each quantized pixel on average. The associated minimum predetermined range is therefore 64.

To reconstruct the original pixel block data, dequantizer 28 must know what range quantizer 30 used to construct the quantization table employed when quantizing the pixel block. The encoded representation of the predetermined range and minimum pixel values are stored in memory 14 in the form of a parameter field 33 associated with the quantized data payload 35 (FIG. 3). Other pixel block parameters included in the parameter field may be, for example, the maximum pixel block value or a reference pixel block value. Again, FIG. 3 illustrates one possible configuration of parameter field 33 as a header prefacing the compressed data payload 35.

Equations (1) and (3) may select block parameters which do not satisfy equation (4), because the selected predetermined minimum value is less than the actual minimum value. For example, if in a given pixel block the minimum pixel value is 100 and the maximum pixel value is 140, then the selected predetermined range is 64. The selected predetermined minimum pixel value resulting from equation (2) is 82. The result of adding the selected minimum to the selected range is 146 which is greater than the actual maximum pixel value. Therefore, all of the values of the pixel block will be represented by the selected predetermined values. However, if the maximum pixel block value is instead 160, the selected predetermined values will remain the same but not completely represent the domain of the pixel block. In this case, quantizer 28 detects this problem and selects the next higher predetermined range of 96 and the predetermined minimum value of 91. The summation of 91 and the predetermined range of 96 is 187, which is greater than the actual maximum pixel block value of 160. Therefore, the quantization and dequantization tables selected from this range will provide levels for all of the pixels in the block.

Figure 4:
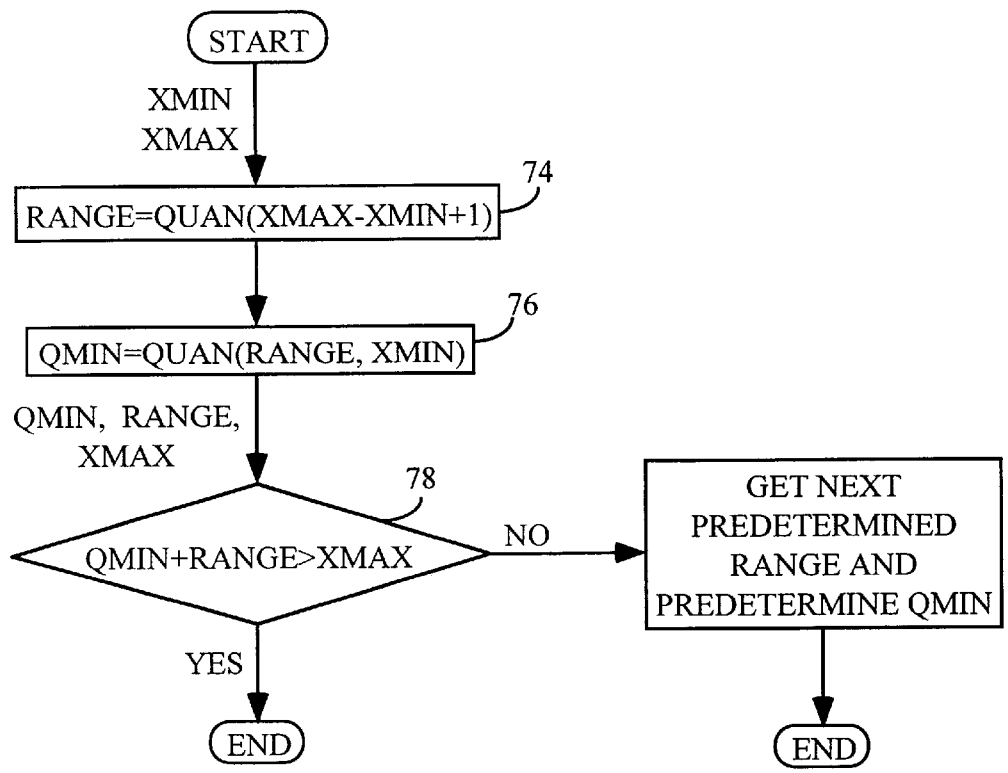
FIG. 4 is a flow chart showing an indexing process according to the present invention.

FIG. 4 is a flow chart showing the index selection process to ensure the range chosen incorporates all pixel values relative to the predetermined minimum. This process is not used for the predetermined ranges of 16 and 256, as explained above. In step 74, the actual range for input pixel values XMIN and XMAX is calculated, and then the predetermined range is selected to accommodate the actual range as described by equation (1) above. In step 76, the predetermined minimum block pixel value QMIN is selected by equation (2). The two selected predetermined values for the range and minimum block pixel are added together, as is seen in step 78, and compared to the actual maximum block pixel value. If the summation in step 78 is greater than the actual maximum block pixel value, the selected predetermined values will include the actual pixel values in the pixel block being processed and the process is finished. If the summation in step 78 is less than or equal to the actual maximum pixel block value, then the predetermined range and minimum block pixel values are discarded and the next greater predetermined range value is chosen. A new predetermined minimum block pixel value associated with the new predetermined range is determined. Once the proper predetermined range and minimum pixel value are chosen, their indices are stored in parameter field 33 (FIG. 3) and the quantization table is selected using the predetermined range value.

Figure 5:
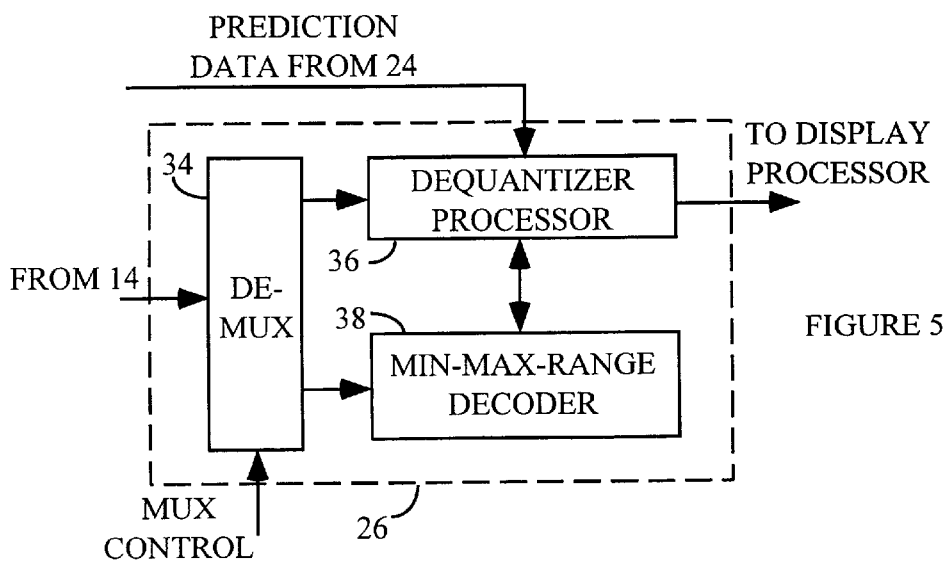
FIG. 5 shows details of the decompression portion of the FIG. 1 system.

FIG. 5 shows the arrangement of a min-max-range decoder (MMRD) 38, a dequantizer processor 36, and a demultiplexer 34 within decompressor 26. Demultiplexer 34 receives the packet including the quantized data and parameter field from memory 14 and sends the parameter field to MMRD 38. MMRD 38 adds the quantized minimum block pixel value from the range to calculate the maximum block pixel value, and sends all block parameters together with quantized data to dequantizer processor 36. Dequantizer processor 36 also receives prediction data from predictor 24 (FIG. 1). Dequantizer processor 36 reconstructs the pixel block to match its original bits-per-pixel size relative to input 10, and outputs the reconstructed data to an output network (FIG. 7).

Referring back to FIG. 1, memory 14 stores the quantized pixel block and the parameter field until they are no longer needed for pixel reconstruction and display. During the time the data reside in memory 14, they may be accessed and decoded by a subsequent display processor via decompressor 16 under the control of a microprocessor using a common data bus. Compressor 12 and decompressor 16 reside in a common integrated circuit and exhibit similar design and construction to simplify the integrated circuit. Memory 14 advantageously resides outside the integrated circuit, thereby allowing the size of memory 14 to be selected as needed to accommodate the signal processing requirements of a particular system. This results in manufacturing cost savings, e.g., in the case of a reduced cost consumer television receiver using a reduced resolution display requiring less frame memory for the MPEG decoder. Also, saved storage area is typically usable by other system components which increases overall system capability.

Figure 6:
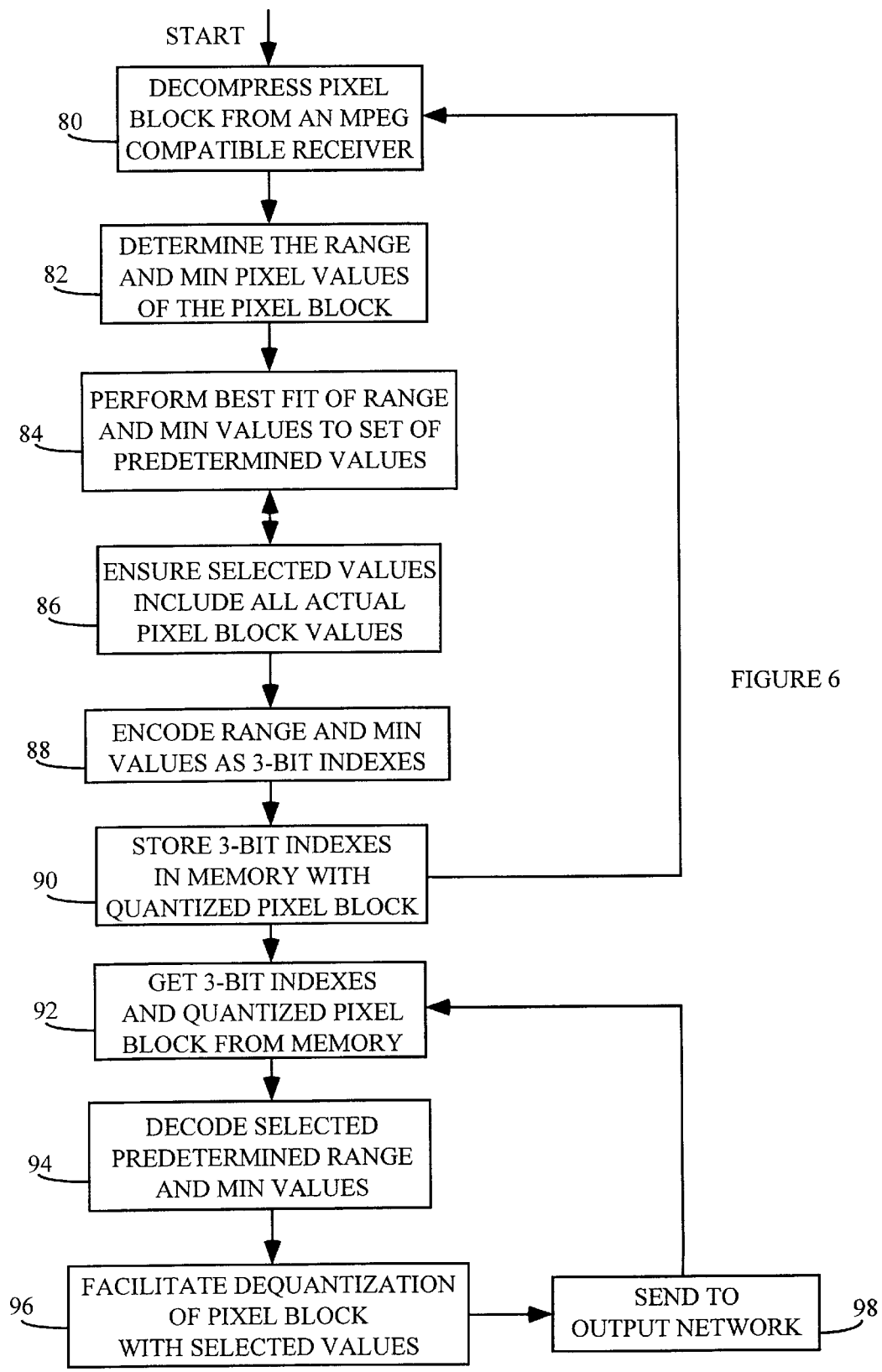
FIG. 6 is a flow chart of a processing method including the present invention.

FIG. 6 exemplifies a flow chart of a data quantization/dequantization network including to the present invention. In step 80, an MPEG compatible receiver supplies a pixel block to the network. The pixel block has been decompressed and is eight-bit chroma or luma data, for example. In step 82, the network evaluates the data and determines the range and minimum (MIN) pixel values within the block. Once the actual range is determined, the network performs a best-fit analysis in step 84 between the actual range and a set of predetermined ranges. The smallest predetermined range from the set which is greater than or equal to the actual range replaces the actual range for the remainder of the process. A set of predetermined minimum values exists for the selected predetermined range. A best-fit analysis is also performed between the actual minimum pixel value for the block and the set to select a representative value. Step 86 ensures that all actual block pixel values are included within the domain which the selected predetermined range and minimum pixel values define. The upper limit of the domain is the summation of the predetermined range and minimum pixel values. If this result is not greater than the actual maximum pixel value, the process returns to step 84 and the next larger predetermined range is selected, as is a new predetermined minimum value. Step 88 encodes the selected predetermined range and minimum pixel values to three bit binary index representations. The indexed representations are stored in memory with the quantized pixel block in step 90. The quantization processing portion of the network then retrieves the next decompressed pixel block and processes it in the same manner, beginning at step 80.

When the output network requires data, the three-bit index representations are retrieved with the quantized pixel block from memory in step 92. The network decodes the three-bit index representations of the selected predetermined range and minimum pixel values in step 94. The network then uses these values to facilitate reconstruction of the quantized pixel block in step 96. The reconstructed data is sent to an output network in step 98. The dequantization processing portion of the network begins again at step 92 to decode indexed representations and reconstruct subsequent pixel blocks in the same manner.

FIG. 7 exemplifies portions of a practical digital signal processing system in a television receiver, including apparatus according to the present invention as discussed previously. The digital television receiver system of FIG. 7 is simplified so as not to burden the drawing with excessive detail. For example, not shown are FIFO input and output buffers associated with various elements, read/write controls, clock generator networks, and control signals for interfacing to external memories which can be of the extended data out type (EDO), synchronous type (SDRAM), rambus DRAM (RDRAM), or any other type of RAM.

Common elements in FIG. 1 and FIG. 7 have the same identifier. Elements in signal processor 72, except for unit 70, correspond to elements found in the STi 3500A MPEG-2/CCIR 600 Video Decoder integrated circuit commercially available from SGS-Thomson Microelectronics.

Briefly, the system of FIG. 7 includes microprocessor 40, bus interface unit 42 and controller 44 coupled to an internal control bus 46. In this example, microprocessor 40 is located external to the integrated circuit containing MPEG decoder 72. A 192 bit wide internal memory bus 48 is a conduit for data to and from compressor 12, similar decompressors 16 and 50, and external frame memory 14. Units 12, 16 and 50 receive compression and decompression factor control signals from microprocessor 40 via controller 44, along with enable control signals. Also included is a local memory control unit 52 which receives Request inputs and provides Acknowledge outputs as well as memory Address outputs, Read Enable and Write Enable outputs. Memory control unit 52 generates real time address and control signals for controlling memory 14. Memory control unit 52 also provides output clock signals Clock Out in response to input clock signals Clock In from a local clock generator (not shown). Microprocessor 40 partitions memory 14 into bit buffers, video frame storage sections and frame storage buffers for MPEG decoding, and display processing and on-screen display maps.

Display processor 54 includes horizontal and vertical resampling filters as needed to convert a decompressed image format to a predetermined common format for display by an image reproducing display device 56. For example, the system may receive and decode image sequences corresponding to formats such as 525 line interlaced, 1125 line interlaced or 720 line progressive scan. A television receiver will likely use a common display format for all receiver formats.

External interface networks 58 convey control and configuration information between the MPEG decoder and external microprocessor 40 in addition to input compressed video data for processing by the MPEG decoder. The MPEG decoder system resembles a compressor-processor for microprocessor 40. For example, microprocessor 40 issues a decode command to the MPEG decoder for each frame to be decoded. The decoder locates the associated header information, which microprocessor 40 then reads. With this information microprocessor 40 issues data for configuring the decoder, e.g. with respect to frame type, quantization matrices, etc., after which the decoder issues appropriate decode commands. Technical specification materials for the SGS-Thomson STi 3500A integrated circuit device noted above provide additional information concerning such manner of MPEG decoder operation.

Microprocessor 40 conveys mode control data, programmed by the receiver manufacturer, to memory controller 52 for controlling the operation of multiplexer 32 (FIG. 2) and demultiplexer 36 (FIG. 5), and for establishing the compression/decompression factors for units 12, 16, and 50 as required. The disclosed system can be used with all profiles and levels of the MPEG specification in the context of various digital data processing schemes, as may be associated with terrestrial broadcast, cable and satellite transmission systems, for example.

FIG. 7 also depicts a portion of a digital video signal processor 72 such as may be found in a television receiver for processing an input high definition video signal. Signal processor 72 may be included in an integrated circuit which includes provisions for receiving and processing standard definition video signals via an analog channel (not shown). Signal processor 72 includes a conventional MPEG decoder constituted by blocks 60, 62, 64, 66, 68, and 70, including frame memory 14. For example, Ang et al. "Video Compression Makes Big Gains," cited above, describes the operation of an MPEG encoder and decoder.

Signal processor 72 receives a controlled data stream of MPEG coded data from a preceding input processor (not shown), e.g., a transport decoder which separates data packets after input signal demodulation. In this example, the received input data stream represents high definition image material (1920×1088 pixels) as specified in the Grand Alliance specification for the United States high definition terrestrial television broadcast system. The input data stream is in the form of a layered data stream representing a sequence of images which have been compressed using the MPEG compression standard. Periodically, these images are compressed and coded as intraframe and interframe information. The intraframe information comprises I-frame anchor frames. The interframe information comprises predictive motion coded residual information representing the image difference between adjacent picture frames. The interframe motion coding involves generating motion vectors representing the offset between a current block being processed and a block in a prior reconstructed image. The motion vector which represents the best match between the current and prior blocks is coded and transmitted. Also, the difference (residual) between each motion compensated 8×8 block and the prior reconstructed block is discrete cosine transformed (DCT), quantized and variable length coded (VLC) before being transmitted. Various publications, including Ang, et al. above, describe motion compensated coding processes in greater detail.

Buffer 60 accepts the input compressed pixel data blocks before being variable length decoded by variable length decoder (VLD) 62. Buffer 60 exhibits a storage capacity of 1.75 Mbits in the case of a main level, main profile MPEG data stream. Inverse quantizer 64 and inverse discrete cosine transformer (IDCT) 66 decompress decoded compressed data from VLD 62. Output data from IDCT 66 is coupled to one input of adder 68.

A signal from buffer 60 controls the quantization step size of inverse quantizer 64 to assure smooth data flow. VLD 62 provides decoded motion vectors to motion compensation unit 70 as will be discussed. VLD 62 also produces an inter/intra frame mode select control signal as known (not shown for simplification). The operation performed by units 62, 64, and 66 are inverse corresponding operations of an encoder located at a transmitter.

By summing the residual image data from unit 66 with predicted image data provided from the output of unit 70, adder 68 provides a reconstructed pixel based on the contents of video frame memory 14. When signal processor 72 has processed an entire frame of pixel blocks, frame memory 14 stores the resulting reconstructed image. In the interframe mode, motion vectors obtained from VLD 62 give the location of the predicted blocks from unit 70.

The image reconstruction process involving adder 68, memory 14 and motion compensation unit 70 advantageously exhibits significantly reduced memory requirements due to the use of block compressor 12 prior to data storage in frame memory 14. The size of frame memory 14 may be reduced by up to fifty percent (50%), for example, when a 50% compression factor is used. Unit 50 performs the inverse function of unit 12, and is similar to decompressor 16 described above. Decompressor 50 reconstructs the image block so motion compensator 70 may function as described above. Compressor 12 and decompressors 16 and 50 are constructed in accordance with the principles of the present invention. FIGS. 1, 2 and 5 illustrate details within units 12, 16 and 50.

What is claimed is:

1. A method for processing a digital data stream containing pixel data blocks representing image information and containing pixel data values within an encompassing range of pixel block limit values, comprising the steps of:
   scanning a block of data to identify a block parameter of said block;
   selecting from a set of predetermined values a value representing said block parameter;
   encoding a pixel block limit value as a function of said selected value; and
   storing said encoded selected value.

2. The method of claim 1, wherein:
   said block parameter is a range of pixel values within an individual pixel block, and
   said selecting step comprises choosing as said selected value a quantized range representative value to represent said range of pixel values.

3. The method of claim 1, wherein:
   said pixel block limit value is a value representing a minimum pixel block luminance or chromininace value.

4. The method of claim 1, including
   repeating said selecting and encoding steps to iteratively derive said encoded selected value.

5. The method of claim 1, wherein:
   said encoding step includes quantizing a value representing said pixel block limit value to derive said encoded selected value.

6. The method of claim 1, wherein:
   said encoding step encodes a pixel block limit value as a function of said selected value by selecting a quantized limit value derived by subtracting said pixel block limit value from a constant value.

7. The method of claim 1, wherein:
   said encoding step encodes a pixel block limit value as a quantized limit value selected from a set of quantized values derived as a function of ((K1−quantized range value)/K2), where K1, K2 are constants.

8. A method for processing MPEG compressed image representative pexel blocks constituting an image frame and containing pixel data values within an encompassing range of pixel block limit values, comprising the steps of:
   decompressing said compressed pixel blocks to produce decompressed pixel blocks;
   scanning a pixel block to identify a block parameter of said pixel block;
   selecting a value from a set of predetermined values for said block parameter;
   encoding a pixel block limit value as a function of said selected value;
   recompressing said decompressed pixel block; and
   storing said recompressed data block and said encoded selected value in a video frame memory.

9. The method of claim 8, wherein:
   said block parameter is a range of pixel values within an individual pixel block, and
   said selecting step comprises choosing as said selected value a quantized range representative value to represent said range of pixel values.

10. The method of claim 8, including
repeating said selecting and encoding steps to iteratively derive said encoded selected value.

11. The method of claim 8, wherein:
said encoding step includes quantizing a value representing said pixel block limit value to derive said encoded selected value.

12. The method of claim 8, wherein:
said encoding step encodes a pixel block limit value as a function of said selected value by selecting a quantized limit value derived by subtracting said pixel block limit value from a constant value.

13. The method of claim 8, wherein:
said encoding step encodes a pixel block limit value as a quantized limit value selected from a set of quantized values derived as a function of ((K1−quantized range value)/K2), where K1, K2 are constants.

* * * * *